(12) United States Patent
Kruse et al.

(10) Patent No.: US 6,774,307 B2
(45) Date of Patent: Aug. 10, 2004

(54) THROUGH-WALL ELECTRICAL SYSTEM

(75) Inventors: Russell E. Kruse, St. Charles, MO (US); Russell L. Bryant, Vernon Hills, IL (US)

(73) Assignee: Applied Technology and Solutions, St. Louis, MO (US)

( * ) Notice: Subject to any disclaimer, the term of this patent is extended or adjusted under 35 U.S.C. 154(b) by 0 days.

(21) Appl. No.: 10/141,695

(22) Filed: May 7, 2002

(65) Prior Publication Data

US 2003/0209358 A1 Nov. 13, 2003

(51) Int. Cl.⁷ .............................................. H01R 13/46
(52) U.S. Cl. ........................ 174/53; 174/57; 220/3.5; 220/3.7; 220/3.8; 220/3.94
(58) Field of Search ...................... 174/53, 57; 220/3.5, 220/3.7, 3.8, 3.94

(56) References Cited

U.S. PATENT DOCUMENTS

| | | | |
|---|---|---|---|
| 2,875,915 A | * 3/1959 | Buckels | 220/3.7 |
| 3,622,029 A | 11/1971 | Ware | |
| 3,814,834 A | * 6/1974 | Glader | 174/57 |
| 4,039,235 A | 8/1977 | Thibeault | |
| 4,105,862 A | * 8/1978 | Hoehn | 174/53 |
| 4,125,767 A | 11/1978 | Silver | |
| 4,203,638 A | 5/1980 | Tansi | |
| 4,520,306 A | 5/1985 | Kirby | |
| 4,842,551 A | * 6/1989 | Heimann | 439/502 |
| 4,854,885 A | 8/1989 | Bowden, Jr., Wade R. et al. | |
| 5,108,313 A | * 4/1992 | Adams | 439/610 |
| 5,839,594 A | 11/1998 | Barbour | |
| 5,965,844 A | * 10/1999 | Lippa | 174/49 |
| 6,147,306 A | * 11/2000 | Wilkins | 174/58 |
| 6,207,895 B1 | * 3/2001 | Engel | 174/53 |

* cited by examiner

Primary Examiner—Anthony Dinkins
Assistant Examiner—Anton B Harris
(74) Attorney, Agent, or Firm—Harness, Dickey & Pierce, P.L.C.

(57) ABSTRACT

A system for accessing an electrical wiring network from opposing sides of a wall. The wall includes at least one structural support and a wall surface. The system includes an electrical box having a perimeter wall and two open sides. The open sides located at opposing ends of the perimeter wall, thereby defining a passageway through the electrical box. Additionally, the system includes a pair of frames coupled to the electrical box at the open sides, and at least two electrical outlets coupled to the frames. Each outlet includes a plurality of integral conductor leads extending therefrom.

17 Claims, 4 Drawing Sheets

THROUGH-WALL ELECTRICAL SYSTEM

FIELD OF INVENTION

The invention relates generally to electrical outlet systems, and more specifically to a through-wall electrical box system designed to reduce labor and material costs associated with installing electrical wiring networks in various structures.

BACKGROUND OF THE INVENTION

Efforts are continuously being made to simplify electrical systems or networks, and the components used in these networks which represent a substantial percentage of the labor and material in commercial and residential construction.

Presently when it is desired to locate electrical outlets, and/or electrical control modules such as, switches, rheostats, or any other similar electrical control module that monitors or controls the flow of electricity, on opposite sides of a common wall or partition, an electrician typically installs separate electrical boxes facing in opposite directions. Electrical outlets are sometimes referred to as electrical sockets or receptacles, but will be referred to as electrical outlets herein. Additionally, each electrical box is typically installed on wall structural supports, e.g. wall studs. This procedure is time consuming and involves using extra electrical wire, boxes, standoffs, conduit and other components used during installation of an electrical wiring network, or system. Further, the electrician must avoid cavities in the walls that will not accommodate two electrical boxes in a certain area of the wall or partition. For example, electrical boxes cannot be installed between studs that define a cold air return space.

Additionally, electrical outlets and control modules are typically installed by attaching wires to screws appending from the sides of the outlet or the sides of the control module. These screws can present a safety hazard when they are connected within a live electrical wiring network, e.g. having live electrical current flowing through the network, and come into contact with a conductive surface, such as a metal electrical box or metal wall stud. Also, if the electrical outlet or control module is connected to a live wiring network, a person could be severely shocked upon contacting the screws. Furthermore, the screws can cause accidental injuries to the hands of the person installing the outlet or the control module if a screwdriver that is used to tighten the screws slips off one of the screws.

Through-way electrical boxes have been developed in an attempt to reduce the additional labor and material costs incurred in the installation of electrical wiring networks. However, known through-wall boxes do not allow for using one cavity in a wall to install electrical outlets and/or control modules on opposing sides of the wall without subjecting the electrician, or person installing the outlets and/or control modules, to time consuming mechanical detail work. Some known through-wall boxes require numerous components and fittings which must be adjusted during the installation process, while other known through-wall boxes are not suitable for installing multiple electrical outlets and/or control modules on each side of the wall.

Additionally, plaster ring plates that cover existing electrical boxes, also referred to herein as frames, typically include an aperture for receiving the electrical outlet and/or control module that is centered in the frame. This placement of the aperture does not permit the most efficient use of space within the electrical box nor ease of electrical outlet and/or control module installation in a back-to-back installation.

Furthermore, at least some electrical codes require the electrician to install pigtails on each outlet and control module, which are then connected to the incoming power source, e.g. the electrical wiring network, with electric wire nuts. The installation of pigtails is labor intensive and increases the material costs of installing outlets and control modules.

Thus, it would be desirable to develop a system that provides access to an electrical wiring network from opposing sides of a wall. More specifically, is would be desirable to provide a through-wall electrical system that overcomes the shortcoming of known through-wall systems, thereby reducing labor and material costs of installing such systems. For example, it would be desirable to provide a through-wall electrical system that reduces the complicity of installation caused by numerous components and fittings that must be adjusted during the installation process. Thus, the system should be suitable for installing multiple electrical outlets and/or control modules on each side of the wall, and should also reduce the risks associated with connecting the outlets and/or control modules to the wiring network via screws appending from the outlets and control modules. Additionally, the system should also satisfy code requirements to connect pigtails to the outlet and/or control module prior to connecting the module.

BRIEF SUMMARY OF THE INVENTION

In a preferred embodiment of the present invention, a system is provided for accessing an electrical wiring network from opposing sides of a wall. The wall includes at least one structural support and a wall covering coupled to the structural supports. The system includes a through-wall electrical box having a perimeter wall and two open sides. The open sides are located at opposing ends of the perimeter wall, thereby defining a passageway through the electrical box. Additionally, the system includes a pair of frames coupled to the electrical box at the open sides, and at least one electrical outlet coupled to the frames. Each outlet includes a plurality of integral leads extending therefrom.

In another preferred embodiment of the present invention, a method is provided for accessing an electrical wiring network from opposing sides of a wall having at least one structural support and a wall surface coupled to the structural support. The method comprises providing an electrical box having a perimeter wall and two open sides that form a passageway through the electrical box, providing a pair of frames wherein each frame includes an aperture located off-center in the frame, and coupling one frame to each pen side such that the apertures of the frames are positioned catty-corner on opposing sides of the electrical box thereby providing space behind each aperture within said electrical box.

In yet another preferred embodiment of the present invention, an electrical outlet is provided for use with an electrical wiring network. The outlet includes a plurality of integral leads extending therefrom that connect to the wiring network.

In still a other preferred embodiment of the present invention, a system is provided for accessing an electrical wiring network from opposing sides of a wall that includes at least one structural support and a wall surface coupled to the structural support. The system includes an electrical box having a perimeter wall and two open sides. The open sides are located at opposing ends of the perimeter wall, thereby defining a passageway through said electrical box. Additionally, the system includes a pair of frames. Each said frame includes an aperture located off-center in the frame. The frames couple t the open sides such that the apertures are positioned catty-corner onto electrical box. Furthermore, the system includes at least one electrical outlet that is coupled to the apertures.

In still yet another preferred embodiment of the present invention, an electrical box frame is provided that includes an aperture located off-center within the frame. The aperture is suitable to receive at least one electrical outlet, and the frame is coupled to the electrical box such that space is provide behind the aperture within the electrical box when the electrical outlet is coupled to the aperture.

BRIEF DESCRIPTION OF THE DRAWINGS

The present invention will become more fully understood from the detailed description and accompanying drawings, wherein.

DETAILED DESCRIPTION OF THE INVENTION

Figure 1:
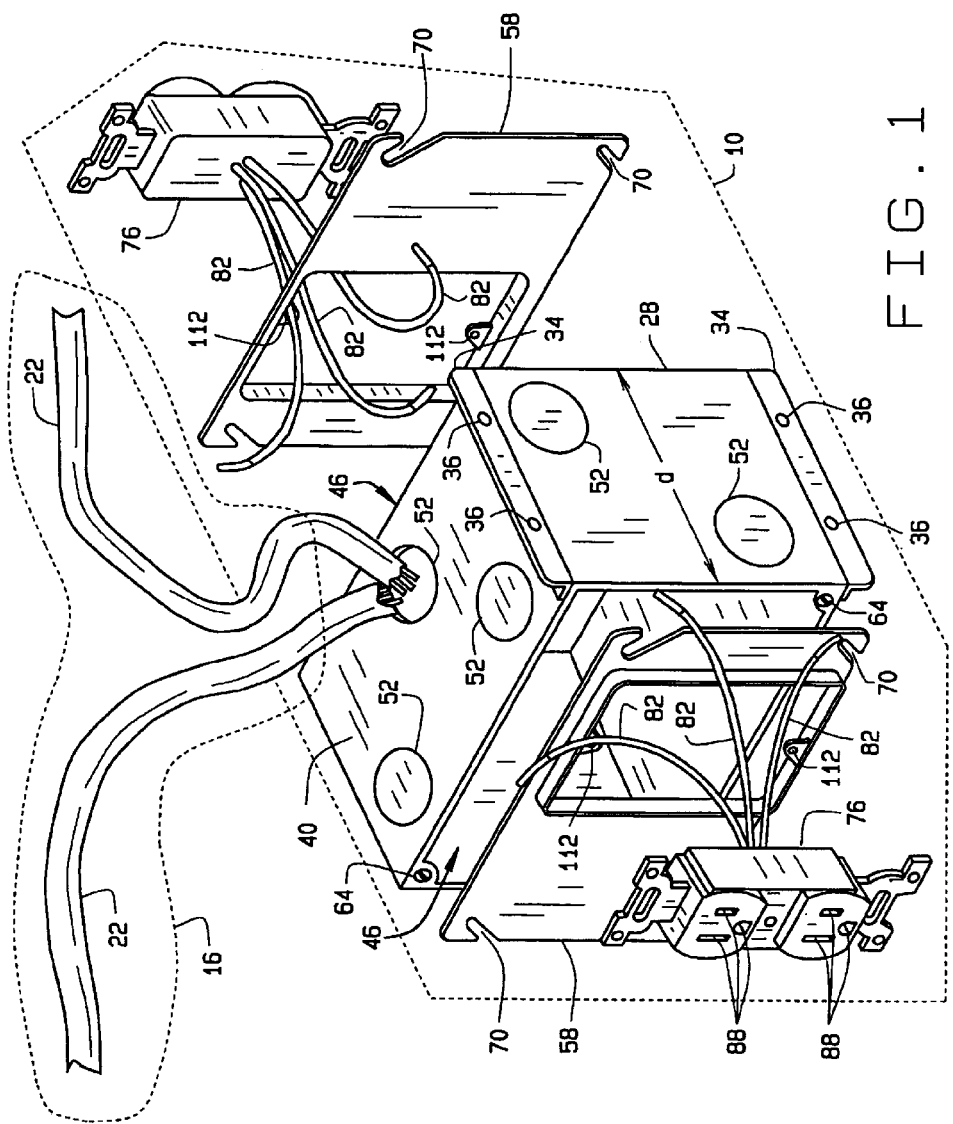
FIG. 1 is a schematic of a system for accessing an electrical wiring network from opposing sides of a common wall, in accordance with a preferred embodiment of the present invention.

FIG. 1 is a schematic of a system 10 for accessing an electrical wiring network 16 from opposing sides of a common wall or partition (not shown), in accordance with a preferred embodiment of the present invention. Wiring network 16, sometimes referred to as an electrical system, is a network of wires installed in a building or other structure that provide and distribute electrical power throughout the building or structure. Wiring network 16 includes a plurality of network branches 22 which are installed inside the walls or partitions of the building or structure, thereby providing and distributing power throughout the building or structure. As used herein, the term plurality is defined as at least two. Wiring network 16 is typically connected to a load center (not shown), also referred to as an breaker box or fuse box, which is the incoming point for electrical service to a residential or commercial building. However, for smaller buildings or structures other than buildings, wiring network 16 may be a sub-network of a larger wiring network and therefore not directly connected to a breaker box.

It is generally known that walls and partitions are typically constructed of at least one structural support, such as a wall stud, and have a wall or partition surface attached to opposing sides of the structural support. System 10 includes a through-wall electrical box 28 that is mounted to one of the structural supports using mounting devices 34 prior to the wall surface being attached to the structural support. Although electrical box 28 is shown in FIG. 1 as having a rectangular shape, it is envisioned that electrical box 28 could have any suitable shape, such as circular, oval, or square. Mounting devices 34 include mounting apertures 36 for receiving nails, screws, or any other fastening device suitable to mount electrical box 28 to the wall or partition structural support. Electrical box 28 is constructed of any material suitable for use in electrical wiring networks, such as plastic or metal. Although mounting device 34 is shown in FIG. 1 as an L-shaped bracket coupled to electrical box 28, it should not be so limited. Mounting device 34 could be any device, system or apparatus suitable for mounting any type of electrical box or similar device to the structural support of a wall or partition, as is well known by those skilled in the art.

Electrical box 28 includes a perimeter wall 40 and two open sides 46 located at opposing ends of perimeter wall 40 thereby defining a passageway through electrical box 28. In a preferred embodiment, perimeter wall 40 has a depth 'd' approximately equal to the width of the structural support to which it is to be mounted. Therefore, electrical box 28 is constructed such that perimeter wall 40 has a specific predetermined depth 'd' that is based upon the width of the structural support used to construct the wall in which electrical box 28 is to be installed. Additionally, in the preferred embodiment, perimeter wall 40 has a uni-body molded construction or is constructed from a single piece of material joined at opposing ends. In an alternate embodiment, electrical box 28 is constructed such that perimeter wall 40 is adjustable to be adapted to walls of various thicknesses. In another alternate embodiment, perimeter wall 40 is constructed of at least two pieces of material joined end-to-end. In yet another embodiment, electrical box 28 is constructed such that perimeter wall 40 has a depth 'd' approximately equal to the width of the structural support plus twice the thickness of the wall surface that is to be attached to both sides of the structural support. Thus, perimeter wall 40 would have a depth 'd' that extends past both outer edges of the structural support a distance approximately equal to the thickness of the wall surface.

Additionally, electrical box 28 includes at least one wiring aperture 52 that allows at least one network branch 22 to pass therethrough. Wiring aperture 52 is shown in FIG. 1 as a wiring aperture commonly known in the art as a knockout, but should not be so limited. Wiring aperture 52 could be any suitable aperture in electrical box 28 configured to allow at least one network branch 22 to pass therethrough. For example, wiring aperture 52 could be an aperture in electrical box 28 fashioned to provide a strain relief feature that allows network branch 22 pass therethrough, but inhibits network branch 22 from being easily retracted from wiring aperture 52. Although FIG. 1 shows wiring network 16 and network branches 22 free from an enclosure, such as electrical conduit, it is envisioned that wiring network may include a plurality of interconnectable enclosure sections, for example electrical conduit. The interconnectable enclosure sections enclose network branches 22, are connected to the structure, and coupled at one end to electrical box 28 utilizing a wiring aperture 52. Therefore, it is to be understood that wiring aperture 52 may be formed in perimeter wall 40 in any known manner for accommodating one or more enclosure sections that enclose and provide protection for network branches 22.

System 10 further includes a pair of frames 58 that are coupled to electrical box 28 at open sides 46 prior to the wall covering being coupled to the structural support. Frames 58 are sometimes referred to in the art as plaster rings or plaster frames, and are constructed of any material suitable for use in electrical wiring networks, such as plastic or metal. In the preferred embodiment, frames 58 are coupled to electrical box 28 using a plurality of screws 64 inserted through a plurality of frame slots 70. Alternatively, frames 58 are coupled to electrical box 28 in any other suitable manner. For example, frames 58 could include apertures through which screws 64 would be inserted, or screws 64 could be replaced with any other type of suitable connector such as, rivets or nylon press-in snap retainers. Further yet, frames 58 could be hingedly connected at one side of perimeter wall 40 and coupled to perimeter wall 40 at the opposing side using any type of connector such as screws, rivets, a latch, or nylon press-in snap retainers. Frames 58 are further described below in reference to FIG. 2.

In the preferred embodiment, system 10 includes at least one electrical outlet 76 that includes a plurality of integral leads 82. Again, plurality as used herein means at least two. At least one lead 82 is connected to a network branch 22 thereby providing electrical power to the respective electrical outlet 76, that is coupled to one frame 58. Electrical outlet 76 provides a source of, or connection point to, electricity flowing through electrical network 16. A person accesses the electricity by inserting a suitable plug adapter connected to any device that utilizes electricity (not shown), into mating electrical receptor holes 88 in electrical outlet 76. Electrical outlet 76 is sometimes known in the art as an electrical socket, or an electrical receptacle, but will be referred to herein as an electrical outlet. Electrical outlet 76 is further described below in reference to FIG. 3.

Figure 2:
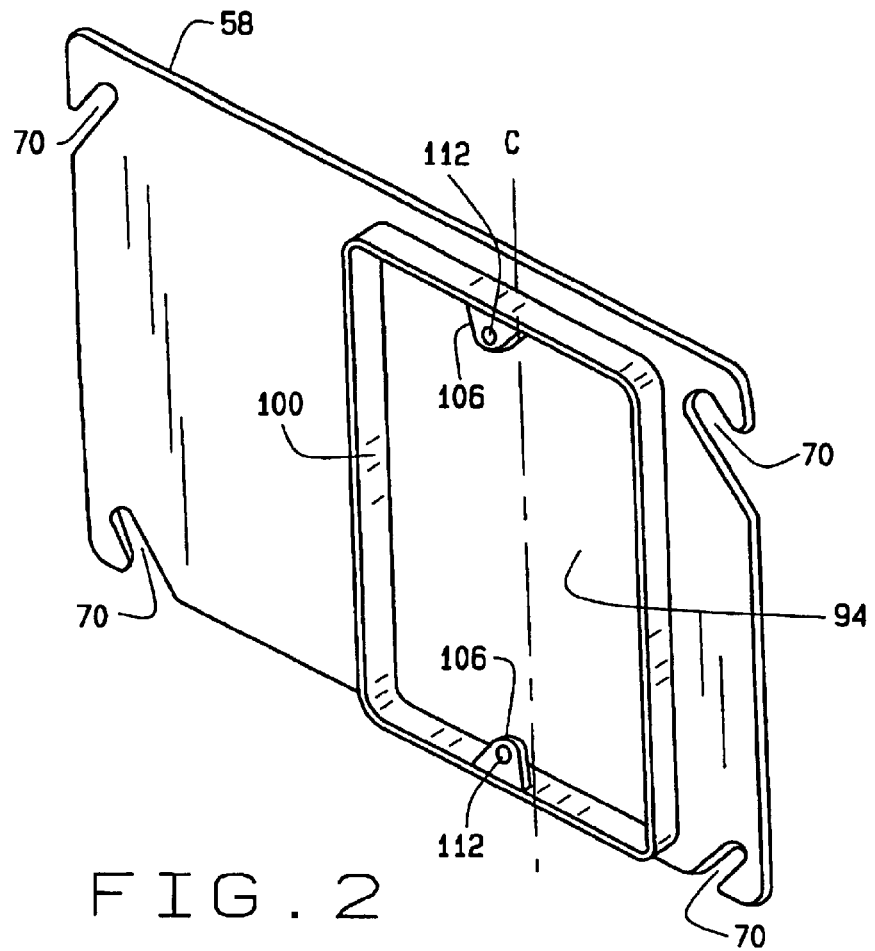
FIG. 2 is a perspective view of a frame used in the system shown in FIG. 1.

FIG. 2 is a perspective view of one of the frames 58 shown in FIG. 1. As described above, frames 58 couple to electrical box 28 (shown in FIG. 1) at open sides 46 (shown in FIG. 1) prior to the wall surface being coupled to the structural supports. Although frame 58 is shown in FIG. 2 having a rectangular shape it should not be so limited. It is envisioned that frame 58 could have any suitable shape, such as circular, oval, or square. Each frame 58 includes a frame aperture 94 that is located off-center in frame 58, such that a centerline 'C' of aperture 94 is substantially closer to one edge of frame 58 than the opposing edge of frame 58. Aperture 94 receives electrical outlet 76 (shown in FIG. 1) when outlet 76 is coupled to frame 58. In an alternate embodiment, aperture 94 of at least one frame 58 receives at least two electrical outlets 76. Although aperture 94 is shown in FIG. 2 having a rectangular shape, it is envisioned that aperture 94 could have any suitable shape, such as circular, oval, or square, and could have dimensions larger or smaller with respect to the overall size of frame 58 than is shown in FIG. 2. In the preferred embodiment, aperture 94 includes a raised lip 100 extending along the perimeter of aperture 94 that has a predetermined height approximately equal to a thickness of the wall surface to be coupled to the structural support on which outlet box 28 is mounted. Raised lip 100 includes a plurality of tabs 106 that include threaded tab holes 112. Outlet 76 is mounted within aperture 94 by coupling outlet 76 to tabs 106. In an alternative embodiment, aperture 94 includes at least two raised lips 100 located at separate points along the perimeter of aperture 94, and each lip 100 includes at least one tab 106 that includes at least one threaded hole 112.

Figure 3:
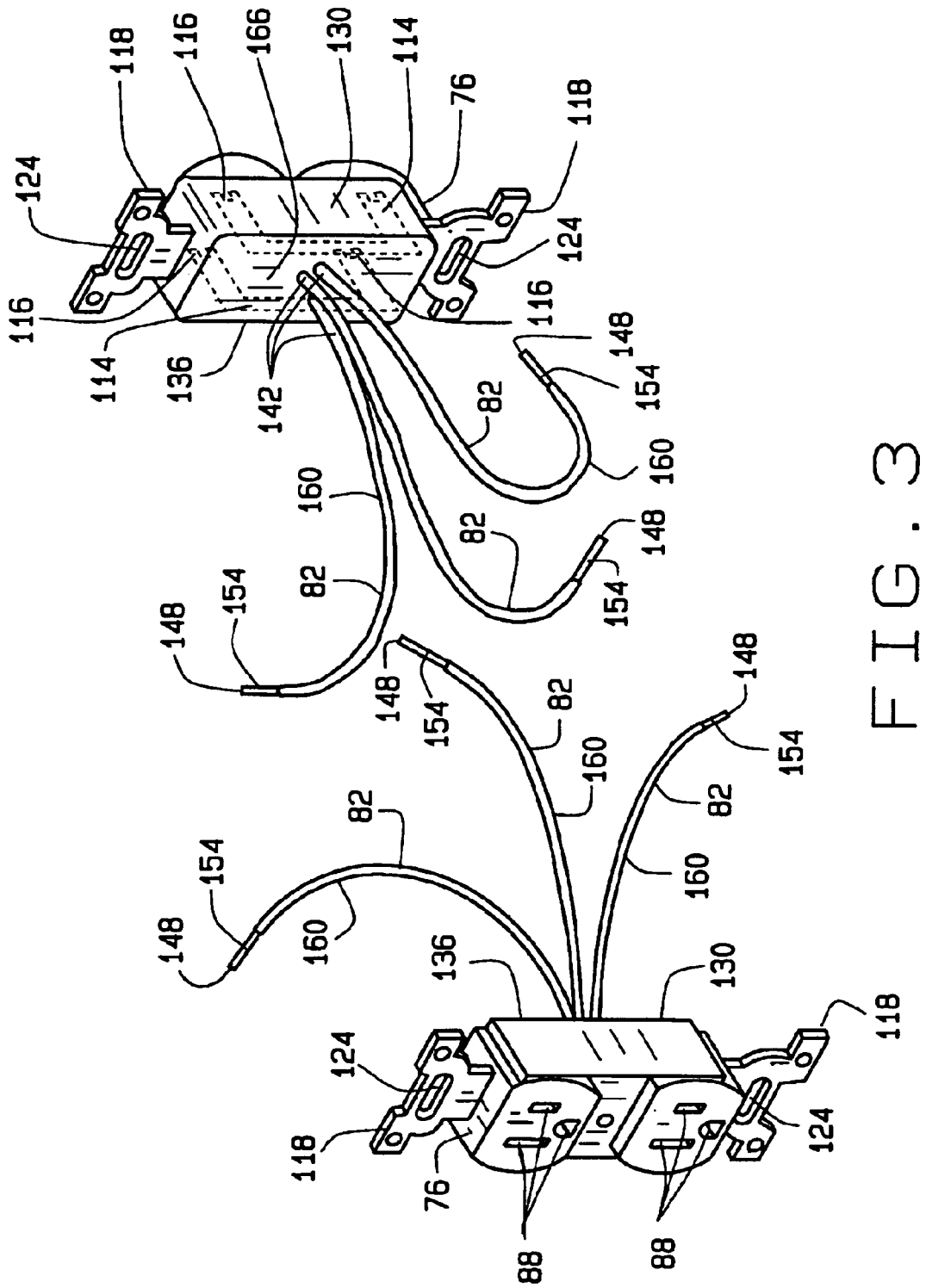
FIG. 3 is a perspective view of an electrical outlet used in the system shown in FIG. 1.

FIG. 3 is a perspective front and back view of electrical outlet 76 used in the system 10 (shown in FIG. 1). As described above, outlet 76 includes a plurality of integral leads 82 wherein a least one lead 82 is connected to wiring network 16 (shown in FIG. 1). Addition By, outlet 76 includes an internal conductive electrical receptor structure 114 having a plurality of receptors 116 configured to receive the plug adapter when the plug adapter is inserted through mating electrical receptor holes 88. Integral leads 82 are connect d to electrical receptor structure 114 such that when outlet 76 is connected to wiring network 16, via leads 82, electrical current is provided at outlet 76 accessible via electric receptor holes 88. Furthermore, each electrical outlet 76 includes at least one outlet mounting bracket 118 that includes at least one mounting hole 124. In the preferred embodiment, outlet 76 is coupled to frame 58 (shown in FIG. 1) by inserting a screw through outlet mounting bracket hole 124 and threading the screw into tab hole 112 (shown in FIG. 1). Alternatively, outlet 76 can be mounted to one of frames 58 by inserting a rivet or nylon press-in snap retainer through bracket hole 124 and into tab hole 112, or by any other suitable means.

Electrical outlet 76 further includes an outlet housing 130 constructed of a non-conductive material, such as plastic or rubber. In addition to being constructed of a non-conductive material, outlet housing 130 has a comprehensively non-conductive outer surface 136 free from conductive appendages or surfaces that are electrically active, or live, when outlet 76 is connected to wiring network 16. Known electrical outlets do not include leads 82, but instead typically include metal screw posts appending from the outlet housing to which a wiring network is connected either directly or via pigtails connected to the metal screw posts. In the present invention, the entire outer surface 136 of each outlet housing 130 is free from any actively conductive appendages or surfaces, such as metal screw posts, or any other actively conductive metal appending from, protruding from, attached to, or otherwise exposed via an aperture in outlet housing 130 that would be in contact with or connected to wiring network 16.

As used herein 'actively conductive' appendage or surface is defined to mean any appendage or surface that is designed to have live current flowing through it once outlet 76 is connected to wiring network 16 as described herein. Therefore, when wiring network 16 is connected to an outlet 76, outlet housing outer surface 136 can be contacted by a person, or come into contact with a conductive surface, such as an outlet box 40 constructed of metal, without the risk of electrical shock or shorting. It is envisioned that housing 130 is of two part construction comprising a first part having receptor holes 88 and a second part from which leads 82 extend.

Each lead 82 includes a proximal end 142, a distal end 148, a wire 154, and an insulating layer 160 covering wire 154. Insulating layer 160 is constructed of any electrically insulating material, such as plastic or rubber. In the preferred embodiment, at least one lead 82 has a predetermined length of insulating layer 160 pre-stripped from distal end 148 thereby exposing a predetermined length of wire 154. Outlet 76 is thereby connected to wiring network 16 by connecting the pre-stripped end of at least one lead to a network branch 22. In an alternate embodiment, insulating layer 160 covers wire 154 from proximal end 142 to distal end 148, and outlet 76 is connected to wiring network 16 by stripping a desired length of insulating layer 160 from at least one lead 82, thereby exposing a desired length of wire 154, then connecting the exposed length of wire 154 to a network branch 22.

In the preferred embodiment, proximal end 142 of each lead 82 extends through outlet housing 130 and is connected to actively conductive electrical receptor structure 114 inside outlet 76 such that each lead 82 is integrally formed, or assembled, with outlet 76. Proximal ends 142 are connected to receptor structure 114 inside outlet 76 using any suitable means such as soldering ends 142 to receptor structure 114, or using a crimping type connection, or using any type of suitable connector assembly, e.g. a jack, a plug, or a strain relief. Therefore, leads 82 are integrally formed or assembled with outlet 76.

Furthermore, in the preferred embodiment, leads 82 extend from a back side 166 of outlet housing 130. Alternatively, leads 82 can extend from any other side of outlet housing 130. It is envisioned that outlet 76 is suitable for use as part of system 10 as described above, and also suitable for use as a stand-alone electrical outlet suitable for use in conjunction with other known types and configurations of outlet boxes. Additionally, in the preferred embodiment, leads 82 all extend individually from housing 130. In another alternate embodiment, leads 82 are bundled together inside a non-conductive casing and only a predetermined length of each distal end 148 extends past a distal end of the non-conductive casing.

Figure 4:
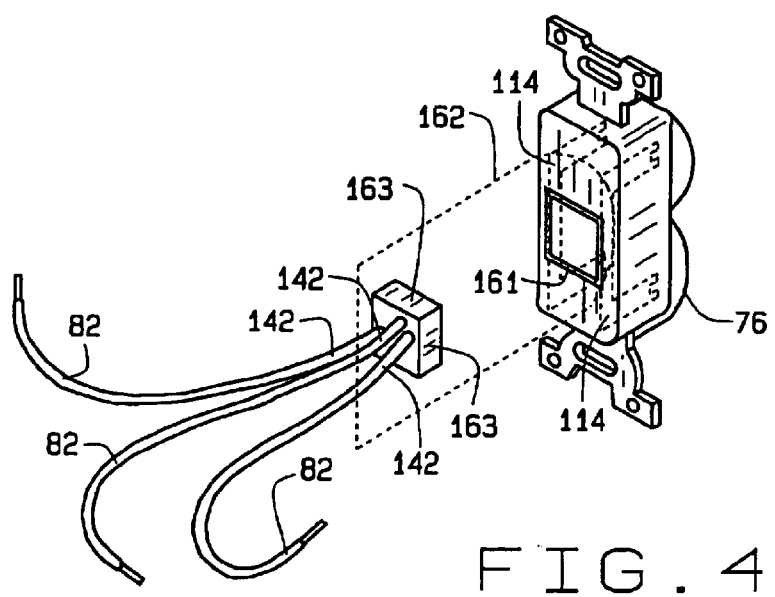
FIG. 4 is a perspective view of an alternate embodiment of the electrical outlet shown in FIG. 3.

FIG. 4 is an in alternate embodiment of outlet 76 wherein outlet 76 includes a first connector 161 of a connector module 162. First connector 161 is connected to receptor structure 114. Additionally, the proximal ends 142 of each lead 82 are connected to a mating second connector 163 of connector module 162, thereby forming a subassembly that can be coupled with and decoupled from first connector 161. Therefore, the subassembly can be connected to network branch 22, and outlet 76 can subsequently be connected to network branch 22 by coupling the subassembly second connector 163 with mating first connector 161 of outlet 76. Connector module 162 can be any suitable electrical connection assembly such as a pronged plug assembly or any suitable modular electrical connection device.

Figure 5:
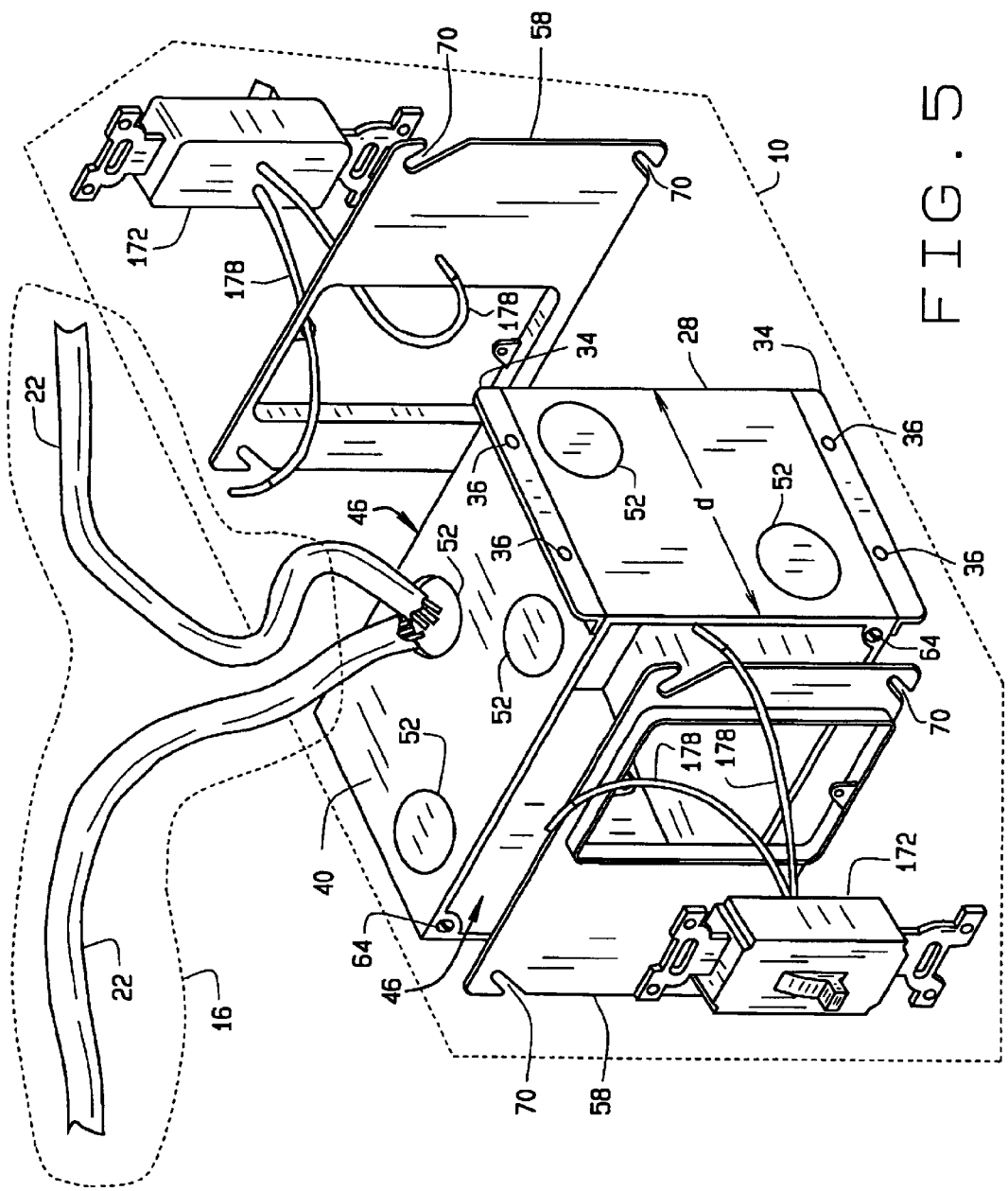
FIG. 5 is a schematic of an alternate embodiment of the system shown in FIG. 1 including a plurality of electrical control modules.

FIG. 5 is an alternate embodiment of system 10 including a plurality of electrical control modules 172. Control modules 172 include a plurality of integral leads 178 that are integrally formed or assembled with control module 172 in the same manner and fashion as lead 82 (shown in FIG. 3) are integrally formed with outlet 76 (shown in FIG. 3). Additionally, integral leads 178 connect to a network branch 22 in the same manner and fashion as leads 82. Control modules 172 are any electrical control module, such as switches or rheostats, that monitor and/or control the flow of electricity. Additionally, control modules 172 connect to frames 58 in the same manner and fashion as electrical outlets 76 (shown in FIG. 1). In yet another alternate embodiment, system 10 includes any combination of at least one electrical outlet 76 and at least one control module 172.

Although system 10 has been described in conjunction with a commercial or residential electrical supply network, it is envisioned that system 10 could be utilized in conjunction with other networks that are utilized for the transmission of mediums other than electricity, such a light or sound. For example, system 10 could be implemented in conjunction with a fiber optic network, or a low voltage communications network, e.g. telephone network, or a coaxial communication network, e.g. a cable television network, or a satellite communication network, or an audio network, e.g. an audio entertainment network or public address network. In which case outlets 76 and control modules 172 would be outlets and control modules associated with such networks.

While the invention has been described in terms of various specific embodiments, those skilled in the art will recognize that the invention can be practiced with modification within the spirit and scope of the claims.

What is claimed is:

1. A system for providing access to an electrical wiring network from opposing sides of a wall, the wall comprising at least one structural support, said system comprising:

an electrical box comprising a perimeter wall and two open sides, said open sides located at opposing ends of said perimeter wall, thereby defining a passageway through said electrical box;

a pair of frames, each said frame comprising a single aperture located substantially off-center in said frame, said frames configured to be coupled to said opposing open sides such that each said aperture is located substantially off-center within said respective open side, whereby said apertures are positioned diagonally opposed from each other on said electrical box; and at least one electrical outlet configured to be coupled to each said aperture such that said electrical outlets are positioned diagonally opposed within said electrical box; and wherein the diagonally opposed apertures provide space behind each said electrical outlet such that wiring connected to said electrical outlet in one of said apertures will not interfere with wiring connected to said electrical outlet in said other diagonally opposed aperture.

2. The system of claim 1 wherein each said aperture comprises at least one raised lip located along the perimeter of said aperture configured to have a height equal to a thickness of the wall surface, each said aperture configured to receive at least one electrical outlet.

3. The system of claim 1 wherein said electrical outlet comprises a housing having a non-conductive outer surface free from actively conductive appendages.

4. The system of claim 1 wherein said electrical outlet comprises a housing having a non-conductive outer surface free from exposed actively conductive surfaces.

5. The system of claim 1 wherein said electrical outlet comprises a plurality of integral leads extending therefrom.

6. The system of claim 5 wherein each said lead comprises a proximal end, a distal end, a wire, and a layer of insulating material covering said wire from said proximal and to said distal end.

7. The system of claim 6 wherein a predetermined length of said insulating material is pre-stripped from said distal end of at least one said lead.

8. The system of claim 6 wherein said outlet further comprises a first connector of an electrical connection module and said lead proximal ends are connected to a second connector of said electrical connection module, said first connector configured to couple with said second connector thereby providing electrical connection of said leads with said receptors.

9. The system of claim 1 wherein said electrical box perimeter wall configured to have a depth equal to a width of the structural support, said electrical box configured to be coupled to the structural support and said frames configured to be coupled to said electrical box prior to the wall surface being coupled to the structural support.

10. The system of claim 1 wherein said electrical box perimeter wall is configured to have a depth approximately equal to a width of the structural support plus the thickness of at least one wall surface attached to at least one side of the structural support.

11. The system of claim 1 wherein said electrical box perimeter wall is configured to adjustable such that the depth of the perimeter wall is adjustable to various depths.

12. The system of claim 1 wherein said system further includes at least one electrical control module configured to be coupled to one of said frames, each said control module comprising a plurality of integral leads extending therefrom.

13. A utility box frame comprising a single aperture located substantially off-center within said frame, said aperture configured to receive at least one medium distribution module, said frame configured to be coupled to an open side of a utility box such that a vertical centerline of said frame approximately aligns with a vertical centerline of the utility box, said off-center aperture configured to be located substantially off-center within said open side when coupled to said utility box such that a vertical centerline of said aperture is substantially closer to a first edge of the utility box than an opposing second edge of the utility box, thereby providing substantial space within the utility box when the medium distribution module is coupled to said aperture.

14. The frame of claim 13 wherein said aperture comprises at least one raised lip located along the perimeter of said aperture configured to have a height equal to a thickness of a wall surface.

15. The system of claim 5, wherein said integral leads are bundled together inside a non-conductive casing such that at least a portion of said distal ends of said integral leads extends past a distal end of said non-conductive casing.

16. The frame of claim 13 wherein said frame further comprises a solid portion located adjacent said aperture, said solid portion configured to be at least as wide as said aperture.

17. A system for providing access to an electrical wiring network from opposing sides of a wall, said system comprising:

an electrical box comprising a perimeter wall and two open sides, said open sides located at opposing ends of said perimeter wall, thereby defining a passageway through said electrical box; and a pair of frames, each said frame comprising a single aperture located substantially off-center within said frame, said frames configured to be coupled to said opposing open sides of said electrical box such that a vertical centerline of each said frame approximately aligns with a vertical centerline of said electrical box, said off-center apertures configured to be located substantially off-center within each said respective open side such that a vertical centerline of each said aperture is substantially closer to one edge of the electrical box than an opposing other edge of the said electrical box, thereby positioning said apertures diagonally opposed from each other on said electrical box, wherein the diagonally opposed apertures provide space behind each said electrical outlet such that wiring connected to said electrical outlet in one of said aperture will not interfere with wiring connected to said electrical outlet in said other diagonally opposed aperture.

* * * * *